US009292813B2

(12) United States Patent
Tucker et al.

(10) Patent No.: US 9,292,813 B2
(45) Date of Patent: Mar. 22, 2016

(54) SYSTEM AND METHOD FOR COLLECTING AND ORGANIZING INFORMATION RELATED TO UTILITY ASSETS

(71) Applicant: Global Precision Solutions, LLP., Grand Junction, CO (US)

(72) Inventors: Page Tucker, Grand Junction, CO (US); Lee Adrian Whitney, III, Fruita, CO (US)

(73) Assignee: GLOBAL PRECISION SOLUTIONS, LLP., Grand Junction, CO (US)

( * ) Notice: Subject to any disclaimer, the term of this patent is extended or adjusted under 35 U.S.C. 154(b) by 0 days.

(21) Appl. No.: 14/307,369

(22) Filed: Jun. 17, 2014

(65) Prior Publication Data

US 2014/0297343 A1 Oct. 2, 2014

Related U.S. Application Data

(63) Continuation of application No. 11/771,260, filed on Jun. 29, 2007, now abandoned.

(60) Provisional application No. 60/818,032, filed on Jun. 30, 2006, provisional application No. 60/838,692, filed on Aug. 18, 2006.

(51) Int. Cl.
  *G01S 13/88* (2006.01)
  *G06Q 10/06* (2012.01)
  *A01B 69/04* (2006.01)

(52) U.S. Cl.
  CPC .......... *G06Q 10/0631* (2013.01); *A01B 69/008* (2013.01); *G01S 13/885* (2013.01)

(58) Field of Classification Search
  CPC ............. A01B 69/008; G06Q 10/0631; G01S 13/885; G01V 3/12; G01V 3/15; G01V 3/17; G01V 3/26; G01V 3/34; G01V 3/38; E02F 9/26; E02F 9/261; E02F 9/262; E02F 9/264; E02F 9/265; E02F 9/245
  See application file for complete search history.

(56) References Cited

U.S. PATENT DOCUMENTS 4,129,224 A 12/1978 Teach
4,288,196 A 9/1981 Sutton, II
(Continued)

FOREIGN PATENT DOCUMENTS

WO WO 2006/014724 2/2006

OTHER PUBLICATIONS

Written Opinion and Search Report for corresponding PCT Application No. PCT/US07/72481; dated Jun. 17, 2008; 12pp.

*Primary Examiner* — Stephen Holwerda
(74) *Attorney, Agent, or Firm* — Lewis Roca Rothgerber Christie LLP

(57) ABSTRACT

A method and system for collecting information related to utility assets include determining a position of an underground utility asset by a location determining device; integrating location data from a Global positioning system (GPS) receiver with the determined position of the underground utility asset to provide information about coordinates of the position of the underground utility asset; adding characteristics of the underground utility asset including a size of the underground utility asset, to the integrated data to generate one or more data records including the information about coordinates of the position of the underground utility asset; integrating landbase data with the data records for the underground utility asset; and displaying a scrolling map including the data records and a portion of the landbase data.

16 Claims, 12 Drawing Sheets

(56) References Cited

U.S. PATENT DOCUMENTS

| | | | |
|---|---|---|---|
| 4,600,356 A | 7/1986 | Bridges et al. | |
| 5,704,142 A * | 1/1998 | Stump | E02F 5/06 172/5 |
| 5,920,194 A * | 7/1999 | Lewis | G01V 3/06 324/326 |
| 5,949,373 A | 9/1999 | Eslambolchi et al. | |
| 5,964,298 A * | 10/1999 | Greenspun | E02F 3/842 172/4.5 |
| 6,282,477 B1 * | 8/2001 | Gudat | E02F 9/26 37/348 |
| 6,377,203 B1 | 4/2002 | Doany | |
| 6,470,976 B2 | 10/2002 | Alft et al. | |
| 6,751,553 B2 | 6/2004 | Young et al. | |
| 6,778,128 B2 | 8/2004 | Tucker et al. | |
| 6,798,379 B2 | 9/2004 | Tucker et al. | |
| 6,963,282 B1 * | 11/2005 | Yeates | A62B 99/00 340/505 |
| 6,975,942 B2 | 12/2005 | Young et al. | |
| 2002/0063652 A1 * | 5/2002 | Price | E02F 9/245 342/22 |
| 2002/0093431 A1 | 7/2002 | Zierolf | |
| 2002/0184235 A1 * | 12/2002 | Young | G01V 1/00 |
| 2003/0000115 A1 * | 1/2003 | Green | E02F 3/435 37/348 |
| 2003/0001775 A1 | 1/2003 | Turner | |
| 2003/0083819 A1 * | 5/2003 | Rooney | G01V 11/00 702/5 |
| 2004/0140923 A1 | 7/2004 | Tucker et al. | |
| 2004/0210370 A1 | 10/2004 | Gudat et al. | |
| 2004/0220731 A1 | 11/2004 | Tucker et al. | |
| 2005/0117973 A1 | 6/2005 | Nelson | |

\* cited by examiner

SYSTEM AND METHOD FOR COLLECTING AND ORGANIZING INFORMATION RELATED TO UTILITY ASSETS

CROSS-REFERENCE TO RELATED APPLICATIONS

This Patent Application is a continuation of U.S. application Ser. No. 11/771,260, filed Jun. 29, 2007, which claims the benefit of the filing date of U.S. Provisional Patent Application Ser. No. 60/818,032, filed on Jun. 30, 2006 and entitled "UTILITY LOCATION SYSTEM;" and Ser. No. 60/838,692, filed on Aug. 18, 2006 and entitled "SYSTEM AND METHOD FOR DIGGING NAVIGATION," the entire contents of which are hereby expressly incorporated by reference.

FIELD OF THE INVENTION

The present invention relates to a system and method for collecting and organizing information related to utility assets.

BACKGROUND

There are many assets above ground and below ground that need to be protected and avoided. Included in these assets are utility lines and components and protected areas, such as archeological sites and habitat of endangered species. There are millions of miles of utility lines around the world, some buried and some above ground. These utility lines include, without limitation, electric power lines, telephone lines, water lines, sewer lines, fiber-optic cable lines, natural gas transmission lines, natural gas distribution lines, and utility lines for transporting hazardous liquids.

Every year incidents occur in which mobile ground breaking equipment comes in contact with utility lines with costly results in loss of life and/or loss of money. In order to understand the full impact of such incidents, one would have to also include environmental damage and economic loss as a result of a service disruption.

There have been many attempts to address damage prevention when groundbreaking equipment is used around utilities and other assets that need protection. Examples of these attempts include marking the location of a utility by painted lines, making a record of the location of the utility lines as the line was placed in the earth or generating data identifying the location of the utility using a fixed object, such as the curbing of a road. In addition, some techniques record the location of a facility as the record to compare to the location of a piece of ground breaking equipment. The location of a utility may be acquired by underground imaging, which may be accomplished by the use of ground penetrating radar or other means.

SUMMARY

In some embodiments, the present invention is a method and system for collecting information related to utility assets. The method includes determining a position of an underground utility asset by a location determining device; by one or more processors, integrating location data from a GPS receiver with the determined position of the underground utility asset to provide information about depth, longitudinal and latitudinal coordinates of the position of the underground utility asset; adding, by one or more processors, characteristics of the underground utility asset including a size of the underground utility asset, to the integrated data to generate one or more data records for the underground utility asset including the information about depth, longitudinal and latitudinal coordinates of the position of the underground utility asset; integrating landbase data with the one or more data records for the underground utility asset; and displaying a scrolling map including the one or more data records and a portion of the landbase data on a display device.

The system and method may further include storing the one or more data records in a remote database retrieving a warning zone for a nearest utility asset from the stored information; and generating a warning signal in accordance with a distance to the nearest utility asset. The system and method may further include defining a project area including the position of the underground utility asset, wherein the scrolling map is a map of the project area; and integrating an imagery of the project area with the data records to generate an image representation of the project area.

DETAILED DESCRIPTION

Figure 1A:
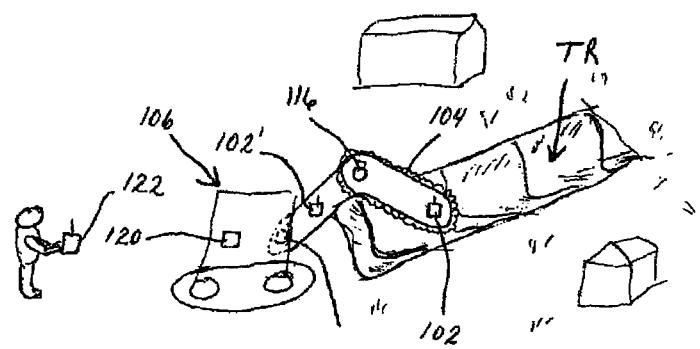
FIGS. 1A, 1B, and 1C show examples of the utility system located on a ground breaking equipment, according to some embodiments of the present invention.

In some embodiments, a utility location and damage prevention system of the present invention is used to locate, protect and avoid various assets that may be located above ground and/or below ground. Such assets include, for example, utility lines and components, protected areas such as archeological sites and habitat of endangered species, and areas including military-related objects such as a mine field, an area with unexploded ordinance, etc. Utility lines include, without limitation, electric power lines, telephone lines, water lines, sewer lines, fiber-optic cable lines, communication cables, natural gas transmission lines, natural gas distribution lines, and utility lines for transporting hazardous liquids. For convenience, the term "asset" may be used herein to refer to any utility or other object that may be located, etc., using a system constructed or a method practiced in accordance with the teachings herein.

In some embodiments at least a portion of the utility location system is located on utility installation equipment that may be positioned at or near a location where the asset is to be, is or has been installed. For example, the utility location system may be installed on equipment that lays or installs a utility (e.g., a pipe), before, during and after installation of the asset. In a typical embodiment a GPS receiver is located in a cab of the installation equipment. Sensors or other mechanisms may then be employed to determine the relative position between the GPS receiver and an end of a boom or other member of the installation equipment that holds the utility as it is laid in the ground. In this way, the location of the utility may be recorded as it is laid in the ground. Alternatively, a GPS antenna and associated components may be located at or near an end of the boom that holds the utility as it is laid in the ground. In this way, the location of the utility may be more directly recorded as it is laid in the ground.

As another example, the utility location system may be installed on equipment that creates a trench or tunnel for a utility (e.g., a pipe). Here, a GPS antenna and associated components may be located at or near an end of the equipment that creates the trench or tunnel. In this way, the location of where the pipe will be installed may be recorded.

These and other aspects of a utility location system will be described in the context of a utility location and damage prevention system that may incorporate precision integration. It should be appreciated that the following is but one example of an application of a system as taught herein. Accordingly, the teachings herein may be applicable to a variety of applications including applications other than those explicitly described here.

In some embodiments a utility location system constructed in accordance with the teachings herein may include a data logger. The data logger may, for example, locate assets such as utility lines and components by measuring and recording the positional coordinates provided by a GPS system. This coordinate data and other data may then be merged with a digital site data record (e.g., a grid, construction site, work area, and the like) process (e.g., stored in a database or other data memory).

The site data record may later be used by a damage prevention module to determine whether there are any assets in the area that could potentially be damaged by, for example, a piece of equipment that may be operating in the area. As an example, a piece of equipment (e.g., a bulldozer or a trencher) may be digging in an area that is close to a buried utility (e.g., a pipeline or cable).

In some embodiments a utility location system may include a GPS antenna, a GPS receiver, a computer (including input and display components) and other components integrated with asset installation equipment. Here, the GPS antenna and, optionally, other components may be co-located with the equipment. The GPS antenna receives GPS signals and routes them to a GPS receiver. The GPS receiver is configured to calculate the GPS coordinates of the antenna. The location of the equipment may thus be accurately determined based on the location of the GPS antenna. The location of an asset may, in turn, be determined based on the location of the equipment used to install the asset.

A utility location system may be incorporated into installation equipment such as excavation equipment to record the location where an asset is to be installed. For example, a GPS receiver and antenna may be located in a cab of excavation equipment and a mechanism (e.g., sensors) provided to reference the location of the GPS receiver to the location of a component of the excavation equipment that creates a trench, a tunnel, etc., within which the asset is installed. In this way, the location of the trench may be accurately determined.

In reference to a digging, excavation, installation, or ground-penetrating machine/equipment (collective referred to as ground breaking equipment), a Digging Tool typically refers to the object that disturbs the earth, soil or rock. The tool may be the teeth on a backhoe bucket, the teeth on a continuous trenching machine or the penetrating drill on a directional drilling apparatus, to name a few examples. A Digging Tool is typically mounted on a controllable extension or arm called a Boom. Booms may be singular, as in one-piece, or they may include several pieces that can move independently of one another, as in an articulated boom typically found on a backhoe. A Boom vertical axis is the point from which the boom moves in the horizontal plane and a Boom lateral axis is a point from which the boom moves in the vertical plane.

Figure 1B:
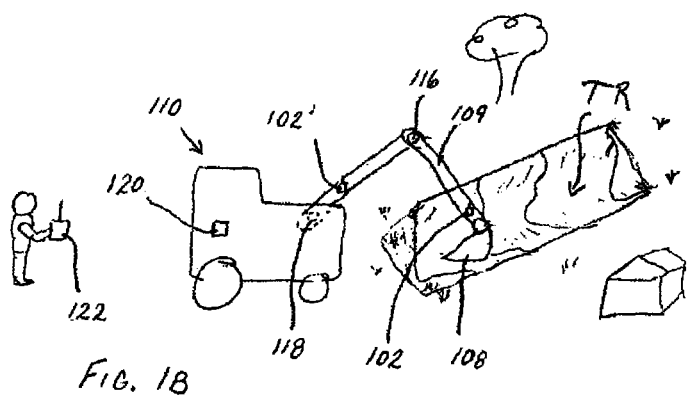
Figure 1C:
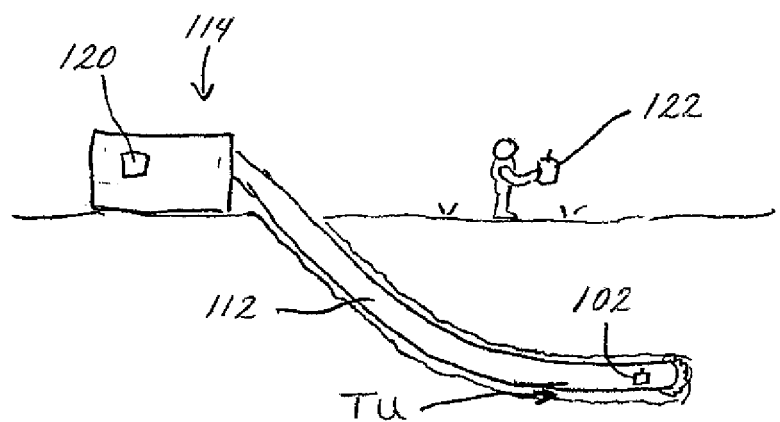

FIGS. 1A, 1B, and 1C show examples of the utility system located on a ground breaking equipment, according to some embodiments of the present invention. In the embodiment of FIG. 1A a GPS receiver and antenna 120 may be located in a cab of a trencher 106 and sensors 116 and 118 are provided to reference the location of the GPS receiver to the location of an end of a trench arm 104 that creates a trench TR for a utility. Similarly, as shown in the embodiment of FIG. 1B, a GPS receiver and antenna 120 may be located in a cab of a backhoe 110 and sensors 116 and 118 are provided to reference the location of the GPS receiver to a bucket 108 that creates a trench TR for a utility. In the embodiment of FIG. 1C, a GPS receiver and antenna 120 may be located in a cab of tunneling equipment 114 and one or more sensors (not shown) are provided to reference the location of the GPS receiver to a tunneling arm 112 that creates a tunnel TU for a utility.

Alternatively, in FIG. 1A a GPS antenna (and, optionally, other components) 102 may be located at or near an end of an arm 104 of a trencher 106 that is used to create a trench TR for a utility. Similarly, as shown in FIG. 1B, the GPS antenna (and, optionally, other components) 102 may be located at or near a bucket 108 at the end of an arm 109 of a backhoe 110 that digs a trench TR. Also, as shown in FIG. 1C, the GPS antenna (and, optionally, other components) 102 may be located on an arm 112 of tunneling equipment 114 that creates a tunnel TU for a utility. It should be appreciated based on the teachings herein that the GPS antenna and other components may be installed on other types of equipment other than those specifically mentioned here.

By locating the GPS antenna on the equipment, the location where an asset it to be laid may be ascertained. For example, a precise location at or near the bottom of the resulting trench TR may be recorded by determining the location of the GPS antenna in FIGS. 1A and 1B. Similarly, a precise location in a tunnel TU (e.g., the center of the tunnel) may be recorded by determining the location of the GPS antenna in FIG. 1C.

Similar results may be obtained by locating the GPS antenna (and, optionally, other components) at a location with a known or accurately determinable relative position with respect to where the trench TR will be made. For example, a GPS antenna (represented as element 102' in FIGS. 1A and 1B) may be located on an arm of the trencher or backhoe. The location of bottom of the trench may then be calculated based on the relative position between the location of the GPS antenna 102' and the location of the end of the trenching arm or location of the bucket. Here, one or more mechanisms may be provided for measuring the angle of the arm(s) of the trencher or backhoe. For example, arms and/or axis 116 and 118 of an arm may include one or more sensors that determine a relative angle of the arm. Since the length of an arm and the position of components (e.g., the GPS antenna 102', the bucket 108, the end of trenching arm 104) on the arm(s) are known, the difference in location (e.g., in X, Y and Z coordinates) between the components may be calculated based on the angle of the arm(s).

Figure 2A:
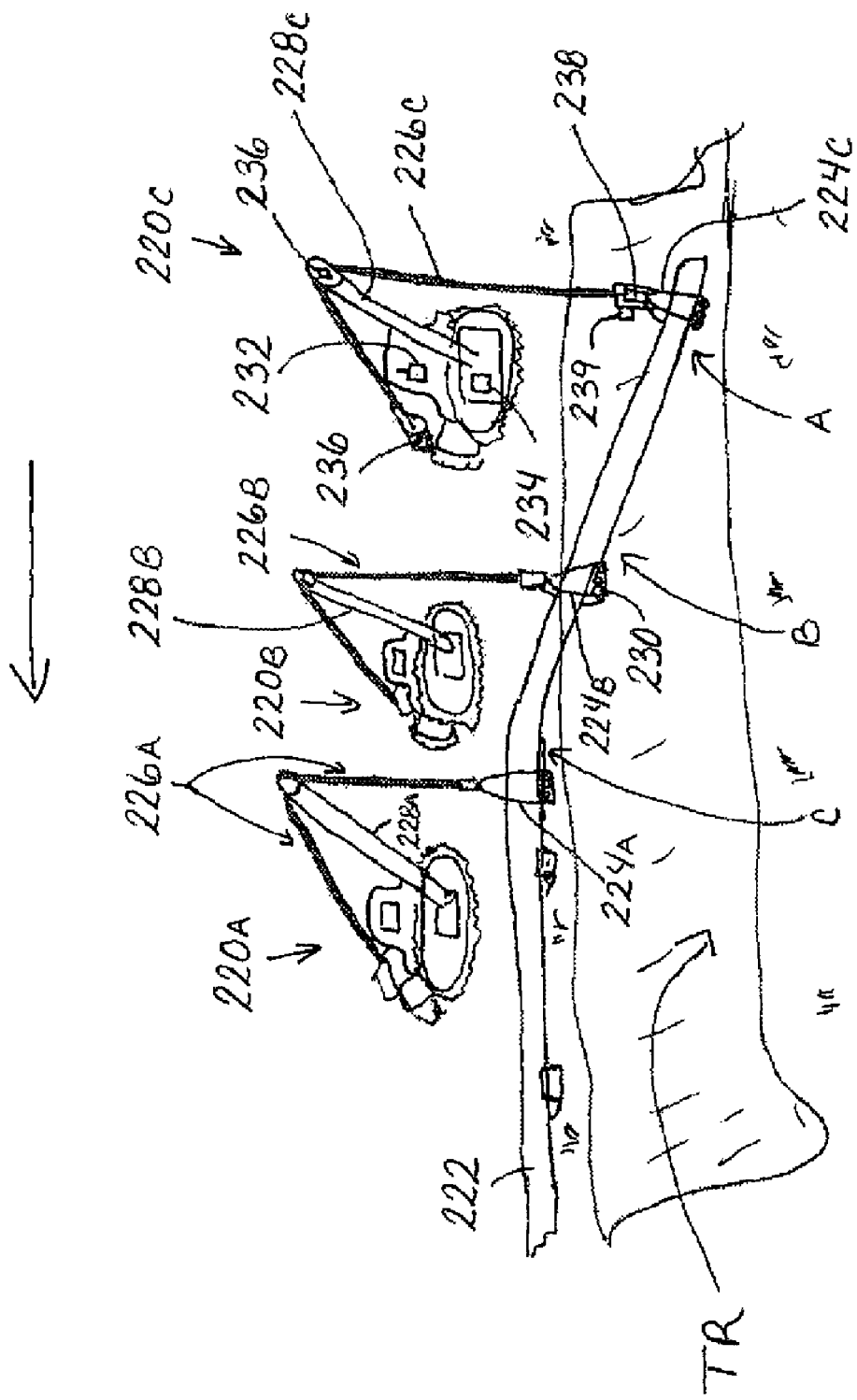
FIGS. 2A, 2B, and 2C show examples of the utility system located on exemplary ground breaking equipment, according to some embodiments of the present invention.
Figure 2B:
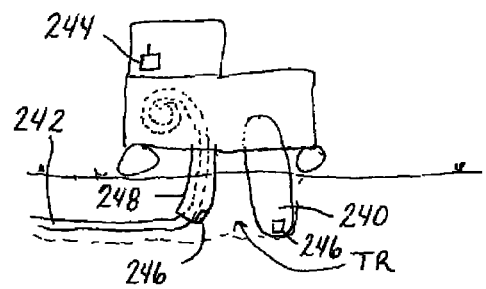
Figure 2C:
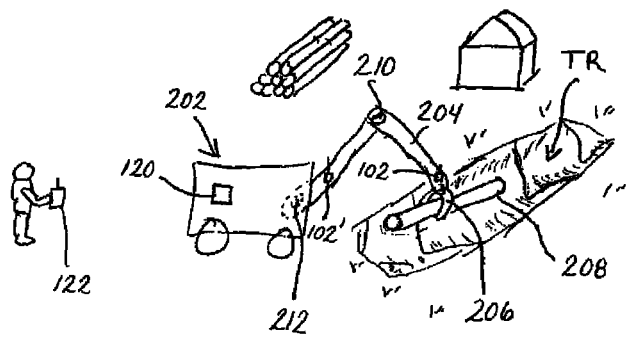
Figure 3:
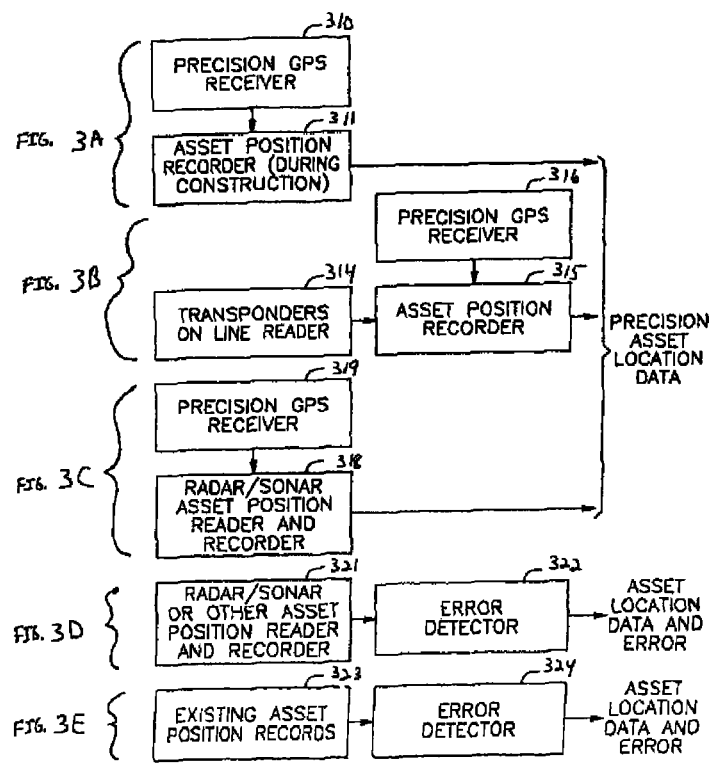
FIGS. 3A-3E show exemplary apparatuses and methods that provide precision locations of a utility asset, as it is being installed, according to some embodiments of the present invention.

FIGS. 2A, 2B, and 2C show examples of the utility system located on exemplary ground breaking equipment, according to some embodiments of the present invention. A GPS antenna also may be co-located on asset installation equipment such as, for example, pipe-laying equipment or cable-laying equipment as shown in the embodiments of FIGS. 2A, B and C. In this way, the location of an asset as it is being installed may be accurately recorded.

FIG. 2A illustrates one embodiment of pipe laying equipment incorporating a utility location system. In FIG. 2A several side booms 220A, B and C cooperate to install a long pipe 222 into a trench TR. It should be appreciated that depending on the needs of a given job a different number of side booms may be used to install a given pipe. Each side boom carries the pipe via a respective cradle (or sling) 224A, B or C attached to a respective cable 226A, B or C that is carried by a respective boom 228A, B or C. Each cradle includes rollers (e.g., rollers 230) that facilitate relative movement between the cradle and the pipe in a longitudinal direction. By moving the boom and cradle (e.g., by moving the cable) in the appropriate manner, the pipe may be lifted from a staging area just outside of the trench then lowered into the trench. For example, a first side boom 220A may initially lift a first section A of the pipe off of skids in the staging area. As the first boom moves down the pipe in the direction indicated by the arrow to lift a second section B of the pipe, a second boom 220B may further lift the first section of the pipe and move that section partially into the trench. As the first boom moves further down the pipe to lift a third section C of the pipe and the second boom moves further down the pipe to further lift and move the second section, a third boom 220C may further lift the first section and move the pipe further into the trench and, ultimately, to the bottom of the trench as illustrated in FIG. 2A.

The side boom (e.g., side boom 220C) that installs the pipe at its final position in the trench includes a utility location system that is used to track the location of the pipe as the pipe is laid. In some embodiments, a GPS receiver and antenna 232 is located in the cab of the side boom 220C. Accordingly, the precise location of the GPS receiver may be determined as the pipe section A is being laid.

In addition, a mechanism is provided for determining the relative position (e.g., in X, Y and Z coordinates) between the GPS receiver and the installed pipe section (e.g., section A). For example, one or more sensors 234 may be provided for measuring the angle(s) of the boom. In addition, one or more sensors 236 may be provided for determining the length of cable extending from the top of the boom to the cradle. Since the length of the boom, the size of the cradle and the position of the GPS receiver are known, the difference in location (e.g., in X, Y and Z coordinates) between the GPS receiver and the cradle may be calculated based on the angle(s) of the boom and the length of the cable. Consequently, the precise location of the cradle (and hence the section of pipe being held by the cradle) may be determined when that section of the pipe is installed in the trench. Alternatively, one or more sensors 238 may be incorporated into the cradle wherein a mechanism is provided to determine the relative position between a sensor 238 and the GPS receiver 232.

In some embodiments other mechanisms may be employed to assist in determining the location or other attributes of an installed utility. For example, an imaging device may be installed on the utility installation equipment to provide a visual record of the installed utility. The imaging device may be installed, for example, at a location that provides a good view of the trench. In some embodiment an imaging device is installed on or near a component of the installation equipment that holds or otherwise places the utility. In the example, of FIG. 2A, an imaging device 239 is located on the cradle 224C. A variety of imaging devices may be used to provide the desire visual record. For example, a camera, a laser scanner or a video recorder may be used to record still images and/or video.

FIG. 2B illustrates one embodiment of cable laying equipment incorporating a utility location system. The cable laying equipment includes a plow 240 that digs a trench TR and includes a mechanism (e.g., including an arm 248) for subsequently laying a cable 242 into the trench. Here, a GPS receiver 244 may be located in the cab of the plow and a mechanism (e.g., sensors) 246 provided to reference the location of the GPS receiver 244 to the location of the plow 240 or to the location of the arm 248 that lays the cable 242 into the trench TR.

Alternatively, the GPS antenna may be located at a location at or near a portion of the equipment that holds the asset as it is being installed to ascertain the location where the asset is being or has been laid. In the example of FIG. 2C, the GPS antenna 102 may be located at or near an end of an arm 204 of pipe-laying equipment 202. A clamping device (e.g., a pair of jaws) 206 located on an end of the arm 204 holds a pipe 208 that is being installed. Thus, since the relative positions of the GPS antenna 102 and the pipe 208 are known or accurately determinable, the precise location of the pipe 208 upon installation may be obtained by determining the position of the GPS antenna 102 at that time.

Similar results may be obtained by locating the GPS antenna at a location with a known relative position with respect to the where the asset is held upon installation. For example, a GPS antenna (represented as element 102' in FIG. 2C) may be located on an arm used to maneuver the jaws 206 that hold the pipe 208. The location of the pipe 208 upon installation may then be calculated based on the relative difference between the location of the GPS antenna 102' and the location of the jaws 206. Here, one or more mechanisms may be provided for measuring the angle of the arm(s) of the pipe-laying equipment 202. For example, an arm and/or axis 210 and 212 of an arm may include one or more sensors that determine the relative angle of the arm. Since the length of an arm and the position of components (e.g., the GPS antenna 102', the jaws 206) on the arm(s) are known, the difference in location (e.g., in X, Y and Z coordinates) between the components may be calculated based on the angle of the arm(s).

In some embodiments, the GPS antenna may be located at or near an end of an arm of equipment that may access the asset after it has been installed. For example, the equipment may have a boom capable of accessing the installed asset. Here, the GPS antenna may be installed on the end of the boom or at some other location on the equipment such that the relative positions of the GPS antenna and the end of the boom may be accurately determined. In this way, the location of the asset after it has been installed may be accurately measured.

Other components of the utility location system that are used in conjunction with the components described above may be located on or near the equipment upon which the GPS antenna is installed. For example, one or more components 120 (which may be different than the receiver 120 discussed above) may be installed in a cab of the equipment. In this way, an operator of the equipment may easily operate the system as needed. In addition or alternatively, personnel in the area may operate one or more portable components 122 of the system.

Accordingly, depending on system requirements, the components of the system as described above may be distributed and configured to communicate with one another to achieve the desired system operation. For example, to minimize the amount of circuitry subjected to the harsh conditions on, for example, a mechanical arm of the equipment, only a minimal amount of equipment may be located on the arm. In some embodiments, only the GPS antenna and associated antenna components (e.g., an amplifier and filter) may be located on the arm. In this case, the GPS receiver may be located in the cab and connected to the GPS antenna and associate components via cabling or another mechanism (not shown). An associated computer may thus be installed in the cab or external to the cab. The GPS receiver and computer may communicate with another via an appropriate communication medium.

It should be appreciated that various combinations of distributed components may be used in implementing a location system as taught herein. For example, in some embodiments the GPS antenna and associated components may communicate with an integrated GPS receiver and computer system that may be installed in the cab or located external to the cab. In some embodiments the GPS receiver may be co-located or integral with the GPS antenna.

It also should be appreciated that the distributed components may use one or more of a variety of communication media to communicate with one another. For example, the components may communicate via electrical, optical or RF signals. Accordingly, the component may include one or more wire-based, optical or wireless transmitters and/or receivers to facilitate such communication.

The GPS location data collected for an asset as described herein, may be combined with other information relating to the asset. Such information may include, for example, information regarding characteristics of the utility such as the owner of the utility, the type of utility (e.g., water, line, electrical cable) and the date of installation, Such information also may describe attributes of the surrounding area and may be used in conjunction with a damage prevention system.

The data location and damage prevention system may utilize real-time-imaging ("RTI") to provide a real time visual location in the context of a project area map enhanced with photo imagery of the project area. During utility data gathering the data collector can see where he is on the map, and verify the locations that he is taking against identifiable landmarks (e.g., as seen and as represented by the display). RTI may show, in real-time, data points that are collected and symbology and other meta-data attributes that may be associated with collected data. Thus, as assets are located they may be displayed on a display device (e.g., of the computer) in conjunction with other attributes of the surrounding area (e.g., streets, landscape features, positional coordinates, etc.).

Accordingly, an operator may use the system to collect or use utility position data. For example, when a utility (e.g., a utility pipe to be buried underground) is initially laid in the ground, the GPS antenna assembly may be positioned near the utility as discussed above. A display device may thus display the equipment's current location including, for example, the GPS position and nearby landmarks (e.g., buildings, roads, vegetation, etc.). The operator may then use the device to make an entry in a database as to the nature (e.g., attributes) of the utility. Through the GPS receiver system, the device may automatically record the GPS coordinates at that location.

After the operator logs the utility data, the data may be sent (e.g., via a wireless transceiver) to a central database. To this end, the system may include one or more transceivers to establish communication with a server associated with the database. Such transceivers may communicate, for example, via a personal, local or wide area network (e.g., Bluetooth, cellular, satellite-based networks). Accordingly, the network may include appropriate access points for communicating with the system in the field.

It should be appreciated that various types of information may be recorded and used in conjunction with the system. For example, an operator may record or retrieve imagery (e.g., video, pictures, graphics, etc.) and/or audio (e.g., operator's comments regarding data acquisition, utility location, etc.) in conjunction with the collection of location data. Here, imagery, audio and other information may be handled as data objects and synchronized with the central server in the same manner as transactional point data (e.g., utility location data).

An operator may then use the system to see where he is on the map and verify the locations of identified utilities, etc., against his current position and identifiable landmarks. Here, the damage prevention module may incorporate visual and audio presentation of warning signals to warn the system operator (e.g., an equipment operator) about potential utility hazards during digging and earth-moving activities.

In some embodiments the system presents a movable map that is displayed to show the accurate position of the data logger or other data collection or data usage device (e.g., damage prevention module) and the operator (e.g., of the equipment) in relation to the site data record. For example, as an operator using the system moves around a project area (changes position) or turns (changes direction) the displayed image may change accordingly (e.g., keeping the operator in the middle of the displayed project area and orientating the project area so that it "faces" the same direction as the operator). This may be done while simultaneously showing the location of utilities (e.g., via a visual representation) within operator defined utility location buffer areas. Thus, utility information may be viewable in reference to imagery of the related or project area, in real time, providing the current position of equipment or personnel relative to the location of utilities and may be viewable as the person moves in any direction.

Highly accurate information products and applications for field use have been developed for utility asset management or utility damage prevention as described in U.S. Pat. No. 7,482, 973, issued Jan. 27, 2009, the disclosure of which is hereby incorporated by reference herein. Here, some embodiments produce an information product, called a Precision Integration (PI) Site Data Record (SDR) that is comprised of (above or below ground) utility location data combined with a GIS Landbase that includes satellite and/or other imagery and mapping information.

In some embodiments the PI SDR advantageously provides the utility location data accurate to within centimeters, without using real-time kinetics (RTK), and within millimeter accuracy using RTK. Some embodiments also provide for the accurate recall of the information based on the generation of data using precision GPS technologies that provide absolute, as opposed to relative, position data. Here, the term precision GPS refers to a GPS system that may provide position information with accuracy as set forth herein for PI. Utility location information may be recalled anywhere, anytime in the world with the above mentioned accuracy.

Such a system may be used for all phases of underground utility management, from initial planning and engineering, through construction and life-cycle maintenance. Utility data may be accurately located and captured or collected by a data logging application using precision GPS technologies. The resultant data, as a PI SDR, may be used in a damage prevention (damage avoidance) application by a damage prevention module which warns users of the proximity of above or below ground utilities in order to avoid damage due to conflict.

In some embodiments an important component of the development of location data with the aforementioned accuracy and recall is Precision Integration (PI). In one aspect PI is a methodology and process and technology used to assure that data points at each step of the information product development are captured using precision GPS and integrated into the information product in a manner that produces data of the accuracy previously described.

In some embodiments Precision Integration (PI) involves the use of an X, Y coordinate, and sometimes also a Z coordinate (e.g., altitude or depth), signal having a horizontal (X, Y coordinate) accuracy within Centimeters, without RTK and millimeter accuracy with RTK and vertical (Z coordinate) accuracy within centimeters without RTK. This accuracy may be provided in collecting utility location data and in creating a geographical information system (GIS) database, called a PI Landbase, that are combined in various steps of the system to provide a PI SDR that in combination substantially implements the PI process. Accordingly, collected utility location information may be accurate to within centimeters without RTK and within millimeters when using RTK. As used herein, the term precision location may be defined as being within centimeters without RTK, and within millimeters when using RTK.

Referring now to FIGS. 3A-6, one embodiment of a damage prevention system will be discussed in more detail. The damage prevention system comprises of several functional components, some of which may be implemented within a common structure. These functional components include an apparatus and method for collecting data, an apparatus and method for manipulating the data to put it into a standardized form, and an apparatus and method for using the data in conjunction with equipment to prevent damage by the equipment or to minimize damage to the equipment.

FIGS. 3A-3E show exemplary apparatuses and methods that provide precision locations of a utility asset, as it is being installed, according to some embodiments of the present invention. Precision asset location data may be created by the apparatus and method of this invention. For example, FIG. 3A shows an exemplary apparatus and method that provides a precision location of the asset, such as a utility line, as it is being placed/installed in the earth. A permanent record of this precision location is based on latitudinal and longitudinal coordinates that are stored for later use. A precision GPS receiver 310 provides the precise latitudinal and longitudinal coordinates for the asset position recorder 311 while the utility line is being placed in the ground.

Another approach for creating a permanent record of the precise location of assets, such as utility lines underground, is shown in FIG. 3B. In this approach, transponders or RFID tags (RFIDs) are placed on the utility line as it is being placed in the ground. Thereafter, when the location of the utility line is to be recorded, a transponder-on-line or RFID reader 314 is moved along the ground to locate the transponders or RFIDs that are on the utility line. As the transponders or RFIDs are read, the position of the transponders or RFIDs, and therefore the utility line, is recorded by the use of an asset position recorder 315 and a precision GPS receiver 316 that is coupled to the recorder 315. The precision GPS receiver 316 may be the same receiver as the GPS receiver 310 of FIG. 3A. The output of the asset position recorder 315 may be an ASCII stream having fields for the latitudinal coordinates, the longitudinal coordinates and the identification of the underground asset. The RFIDs placed on the utility assets may have storage capabilities to record and store other information, as described above.

The two above-described apparatus and method for producing precision asset location data involve the recording of the location during construction while the asset is being placed underground or recording the output of transducers that have been placed on the asset, such as the utility line. Many areas do not have any information as to the location of assets such as utility lines that are underground in the area. An effective way of determining the location of such assets and permanently recording the location for later use is the exemplary apparatus that is shown in FIG. 3C.

This apparatus includes a radar/sonar asset position reader and recorder 318 coupled to and controlled by a precision GPS receiver 319. This GPS receiver 319 may be the same as the GPS receiver 310 of FIG. 3A. Reader and recorder 318 includes an antenna array for transmitting radar and sonar signals into the ground and recording the return signals for locating any assets, such as utility lines, that are underground. This apparatus and method provides a measurement and record of the depth of the utility as well as the longitudinal and latitudinal coordinates of the location of the utility. Further, the reader and the recorder 318 determines and records the size and material of the pipe or conduit of the utility, such as gas pipes, communication lines, water lines and so forth. The output of the reader and recorder 318 may be an ASCII stream with fields for the longitudinal coordinate, latitudinal coordinate and identification of the asset or utility that is underground at the precise location.

There are various devices for locating utilities and recording the location of these utilities such as radar/sonar readers and ground penetrating radar readers. However, the records created by these readers may have the location of the underground asset or facility as much as several feet away from the actual location. For example, geological conditions may have an adverse effect on the ability to detect infrastructure in an area. Clay, river rock and other materials are factors in many parts of the world that make underground imaging less effective or relatively ineffective. If the soil conditions are not conducive for radar, accurate detection lines may be relatively undetectable or not very reliable. Thus, if this information is to be used in a precision damage control system, it is necessary to determine the extent of error and correct for this error when the data is employed.

An exemplary apparatus for employing the records of earlier readers and recorders 321 is shown in FIG. 3D. The output of the reader and recorder 321 passes through an error detector which develops an error correction signal that is coupled to the data and is used in correcting the location of the asset when the data is employed in a damage control system. Further, there are some existing asset position records that have been created when the utility or asset has been placed in the ground. These records also may not be accurate in the location of the asset. Consequently, the difference between recorded location and actual location may be determined as shown in FIG. 3E. An error detector 324 is coupled to the output of existing asset position records medium 323 for developing an error correction signal to be coupled to the data for use by a damage control system.

Figure 4:
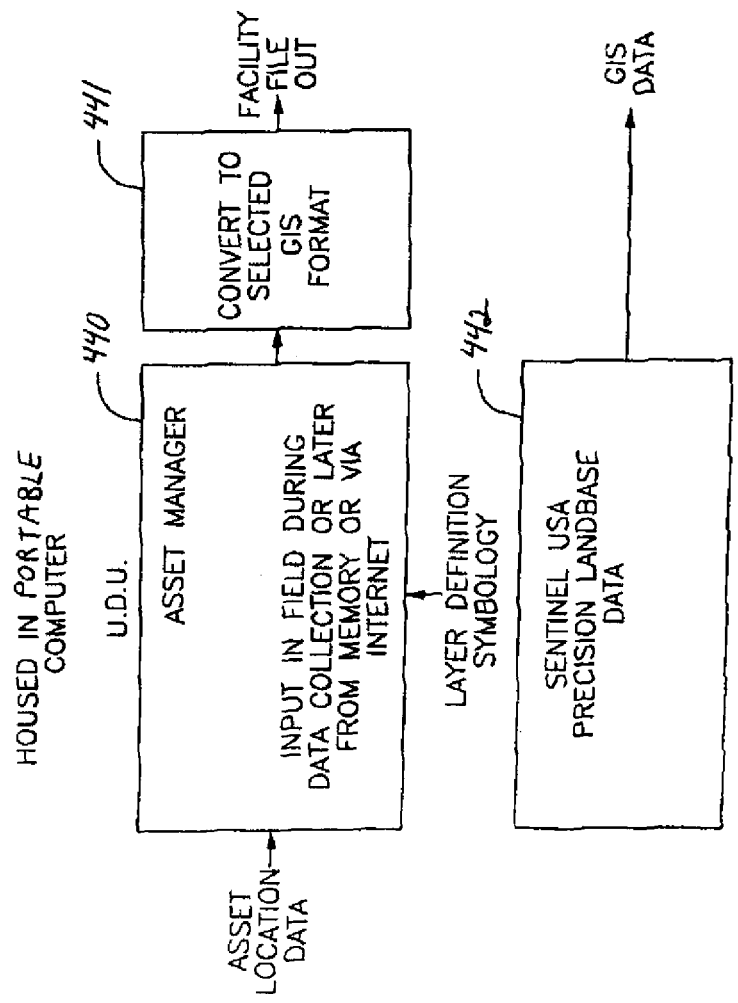
FIG. 4 is an exemplary utility designating unit, according to some embodiments of the present invention.

FIG. 4 is an exemplary utility designating unit, according to some embodiments of the present invention. The asset location data at the output of the apparatus of FIGS. 3A-3E may be coupled as the input to a utility designating unit 440 shown in FIG. 4. The utility designating unit 440 may be located in the field and employed at the same time as the precision asset location data is being read and recorded by the various apparatuses 311, 314, and 318 shown in FIGS. 3A, 3B and 3C. The precision asset location data that is in the form of ASCII codes in designated fields has ASCII fields added in unit 440 to identify the type of utility employing symbology information from a library. A layer definition field is also added based on the type of utility that has been identified. For example, a gas pipeline is a very dangerous utility to cut into in the field while digging in the field. Consequently, gas lines are identified at a higher level than other utilities and have a greater buffer zone around the line to prevent the accidental hitting of the line in the field. The output of the utility designating unit 440 is coupled to a converter 441 that converts the data stream into a GIS format.

The GIS format is selected on the basis of the subsequent use of the data by a damage control unit. In addition to the information concerning the asset or utility, it is often times desirable to have the infrastructure, such as road, fences, waterways, and so forth, that are in the area mapped on a display that is being used for displaying the location of the assets. A location of the infrastructure in the GIS data should be as precise as the location of the utilities from the precise asset location data. The file of such data is contained in the memory 442 shown in FIG. 4.

The utility designating unit 440 may also have input from the readers and recorders 321 and 323 of FIGS. 3D and 3E. In this case, the asset location data will also include the error compensation signal at the output of error detectors 322 and 324. This error signal is used by the utility designating unit 440 to provide an additional buffer or area around the utility based on the degree of error that is shown by the error correction signal.

There may be, for example, two types of equipment that use the data that is provided by the utility designating unit 440 and converter 441 at a work area where the location of assets, need to be known to prevent damage to the asset and/or the equipment at the work area. One type of equipment is used in breaking ground near above-ground assets and near underground assets. Another type of equipment that may use the data is emergency equipment, such as fire fighting equipment, where it is useful to know the location of the various utilities, such as power lines and gas lines. The use of the data will be described in connection with digging equipment at a site.

Figure 5:
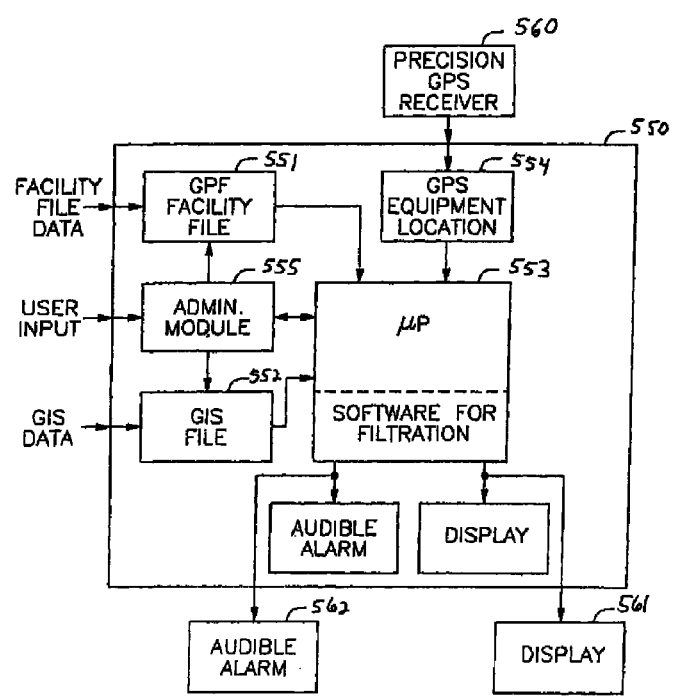
FIG. 5 is an exemplary control unit that may be located on a ground breaking equipment, according to some embodiments of the present invention.

FIG. 5 is an exemplary control unit that may be located on ground breaking equipment, according to some embodiments of the present invention. The asset location data in the form of a facility file at the output of the converter 441 may be provided to a control unit 550 that is positioned on the digging equipment (not shown) at the project site. The control unit or controller 550 may be a computer that includes storage media, an input modem for a GPS location device and administrative modules.

The facility file may be provided by a direct coupling between the converter 441 and the controller 550 on the digging equipment. In this case the asset location data is provided to the utility designating unit 440 on the digging equipment by a memory device or by an Internet coupling or line coupling to a location where the asset location data is stored. Alternatively to the direct coupling, the facility file data may be provided on a memory medium to the controller 550 or may be transmitted to the controller 550 by way of the internet, wireless communication, or direct coupling by line to a facility where the facility file is stored for the particular project site. The controller 550 may include a facility file memory 551 and a GIS file memory 552. The controller 550 further includes a microprocessor and memory 553 that includes software for performing a unique filtration process that identifies the utilities and/or protected areas that are within the selected range of the equipment at the project site. The equipment (digger) is represented by an input modem 554 that provides the OPS location of the equipment at the project site. The OPS location of the equipment is determined by a precision GPS receiver 560 that provides its input to the controller 550 through the modem or GPS equipment location block 554.

An administration module 555 is provided in the controller 550 so that the user of the controller 550 may input control signals for the digger at the particular project site. These control signals include critical distances between identified utilities and the digging equipment for displaying alarms and for also causing audible alarms. The administration module 555 also requires a password to be entered for the user to log into the controller 550 for use at the project location. The user also inputs to the administration module 555 parameters such as the size and reach of the digging equipment and the scale for the display on the display 561. Numerous other parameters may be input to the administration module by the user at the project site. The apparatus at the project site also includes an audible alarm 562 which may be internal of the controller 550 or external of the controller 550 as shown in FIG. 5.

The microprocessor 553 of the controller 550 scans the data in the facility file 551 and displays all utilities within a selected range of the digging equipment. The selected range may be 100 feet or 1000 feet, for example. The controller 550 prevents the accidental hitting or damage to assets, such as gas pipelines, by the digging equipment by a unique filtration process.

Figure 6:
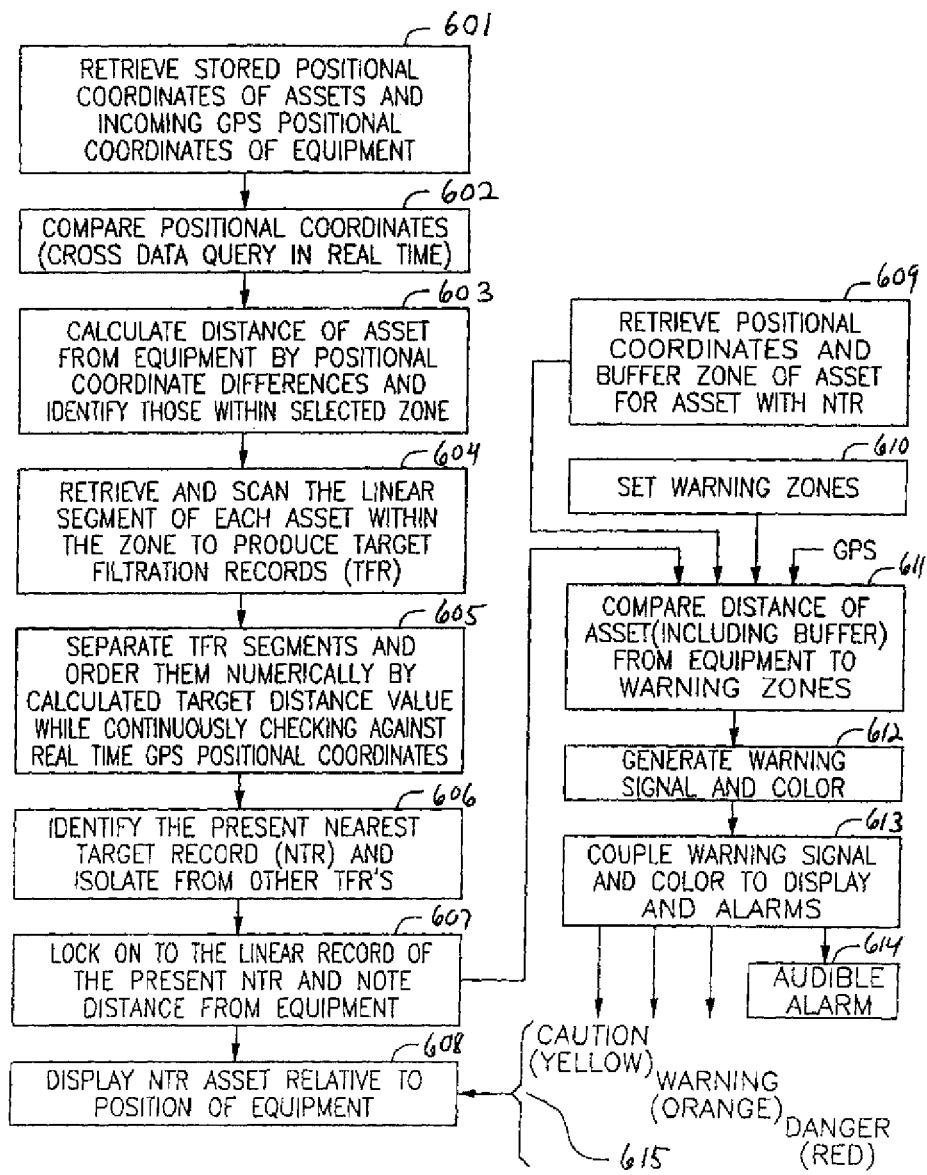
FIG. 6 is an exemplary process flow diagram, according to some embodiments of the present invention.

FIG. 6 is an exemplary process flow diagram, according to some embodiments of the present invention. In block 601 the software for filtration, which is part of the microprocessor 553, retrieves stored positional coordinates of assets and incoming GPS positional coordinates of the digging equipment. In block 602, the filtration process compares the positional coordinates; that is, performs a cross data query in real time between the positional coordinates of the assets and the incoming GPS positional coordinates of the digging equipment. Block 603 of the filtration process includes the calculation of the distance of the assets from the equipment by the positional coordinate differences and identifies those within selected zones. For example, the selected zones may be 10 ft., 20 ft. or 30 ft. from the digging equipment. In block 604, the software retrieves and scans the linear segments of each asset's data stream of the asset within the selected zone to produce target filtration records (TFR). In block 605, the software separates the target filtration record segments and orders them numerically by a calculated target distance value while continuously checking against the real time GPS positional coordinates. In block 606 of the process the software identifies the present nearest target record (NTR) and isolates this record from the other TFRs. In block 607, the software locks onto the linear record of the present nearest target record and notes the distance of this asset from the digging equipment.

In block 608, the software displays the nearest target record asset's position relative to the position of the digging equipment on the display 561. While the nearest target record asset is being displayed on the display 561, the buffer distance for the identified asset is used. In block 609, the process retrieves the positional coordinates and the buffer zone of the asset that has been identified as the nearest target record.

In block 610, the warning zone for the particular asset is retrieved and is an input as part of block 611. In block 611, the distance of the asset that has been identified with the nearest target record (including the assets buffer zone) from the digging equipment is determined and compared to warning zones.

As discussed herein, the system may adjust the NTR warning process to take into account movement of the equipment and the time it takes to calculate a distance to an NTR. For example, the system could measure the amount of time it takes to perform the processes of blocks 601-610, or a portion thereof. Alternatively, this amount of time may be obtained in advance based on, for example, tests, simulations, estimates, etc.

The system also could measure the speed and/or direction of the vehicle at any time during this process. For example, the speed and direction may be measured at one or more points in time that coincide with blocks 601-610 or at some other time during the process.

In block 612, warning signals and colors are generated. In block 613, the warning signal and color are coupled to the display 561 (as represented by lines 615) and to the audible alarm 562. In one embodiment the asset on the display is displayed with a flashing yellow to indicate that the asset is within the designated range for caution. As the relative distance between the asset and digging equipment decreases, the display changes to orange to inform the user that it is in the warning zone. As the distance reaches a critical point of danger, the location of the asset is indicated in a flashing red and the audible alarm signal in block 614 is created and the alarm is sounded in the audible alarm 562. For critical assets such as high pressure gas lines, when the relative distance between the asset and the digging equipment reaches the danger zone, and depending upon the system settings, the digging equipment may be automatically disabled so that no further digging may take place and there will be no damage to the asset and also to the equipment and equipment operator.

Figure 7:
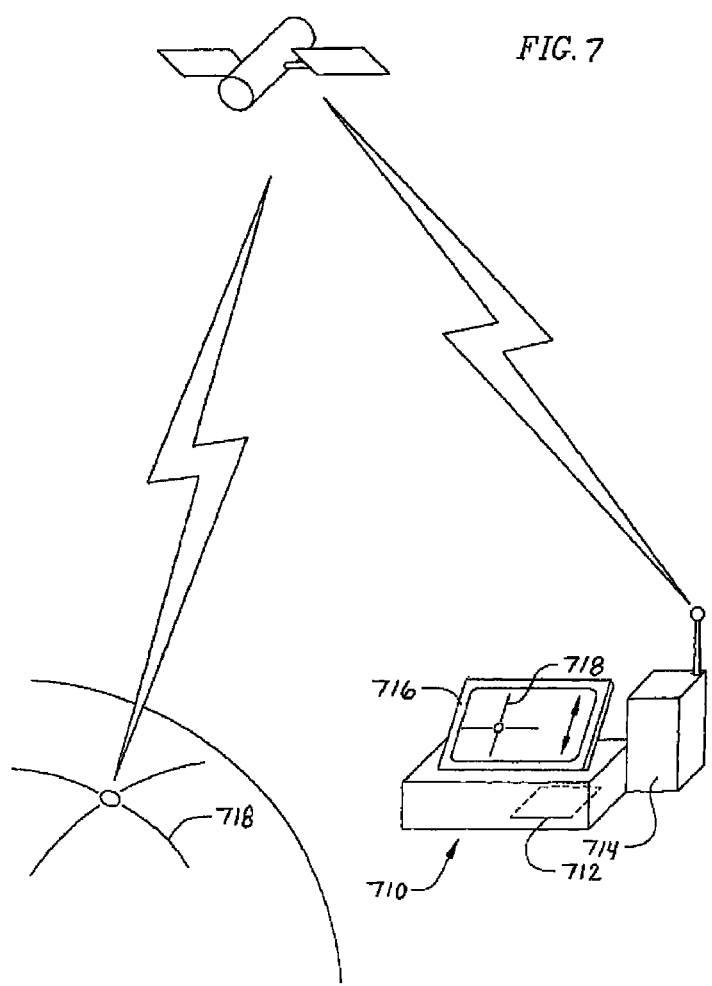
FIG. 7 is an exemplary portable controller, according to some embodiments of the present invention.
Figure 8:
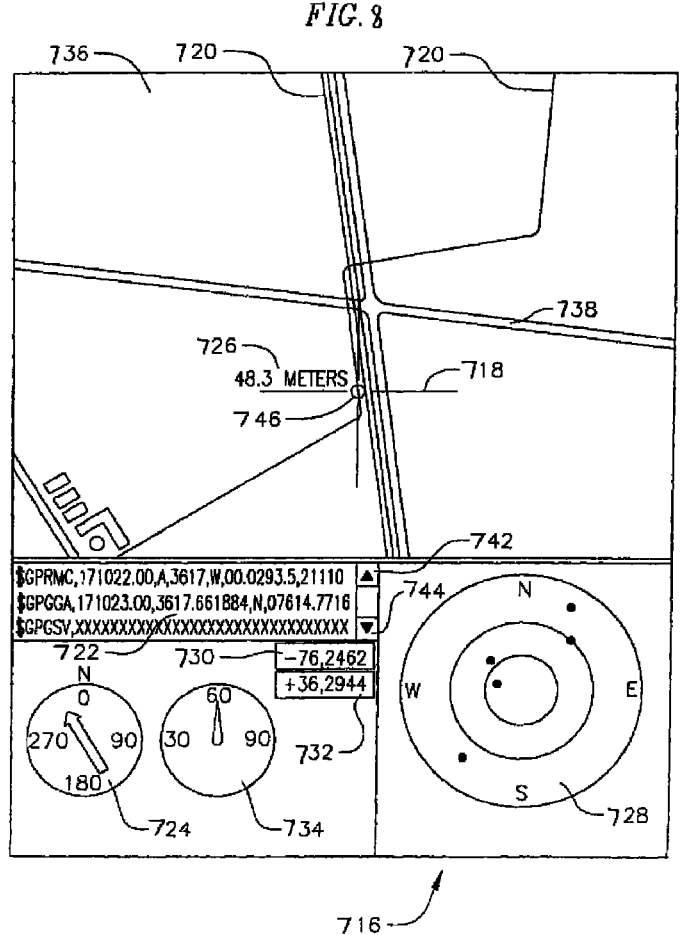
FIG. 8 is an exemplary scrolling display, according to some embodiments of the present invention.
Figure 9:
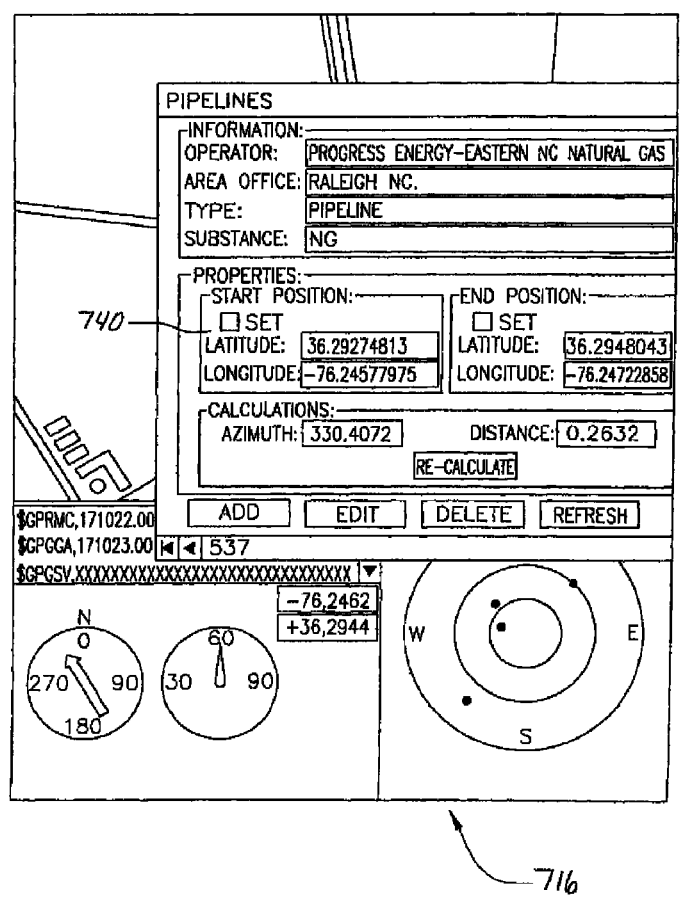
FIG. 9 is an exemplary scrolling display including a pop-up display screen, according to some embodiments of the present invention.

Referring now to FIGS. 7-9, a system and method of dynamically tracking a location of one or more selected utilities as a movement occurs within a municipal service area will now be described.

FIG. 7 is an exemplary portable controller, according to some embodiments of the present invention. As shown in FIG. 7, a portable controller, generally indicated by reference numeral 710 includes a memory 712 and a global positioning system (GPS) co-ordinate device 714. A scrolling display 716 is also coupled to controller 710. A series of GPS co-ordinates 718 for one or more selected utilities 720 within an assigned service area of a municipality are stored in memory 712, as shown in FIG. 8. A GPS co-ordinate device 714 is utilized to dynamically provide GPS co-ordinates 718 to controller 710 as positioning of GPS co-ordinate device 714 changes location.

FIG. 8 is an exemplary scrolling display, according to some embodiments of the present invention. As shown, a scrolling display 716 is used to display GPS co-ordinates of GPS co-ordinate device 714 on a display 722 of global positioning system co-ordinates, together with a series of GPS co-ordinates 718 for one or more of selected utilities 720, such that the relative position of GPS co-ordinate device 714 to one or more selected utilities 718 is always known.

As shown in FIG. 8, scrolling display 716 has a graphic indicator 724, which indicates a direction of travel for GPS co-ordinate device 714. A numeric indicator 726, which indicates the distance in the direction of travel before GPS co-ordinate device 714 encounters the closest of selected utilities 720 is also displayed. A graphic indicator 728 depicts a target, which graphically indicates the positioning of satellites available to GPS co-ordinate device 714.

Also as shown in FIG. 8, scrolling display 716 has a numeric indicator 730, which indicates longitude, and a numeric indicator 732, which indicates latitude. The display also has a graphic indicator 734, which indicates speed of travel of GPS co-ordinate device 714. For example, when a crew (e.g., construction, excavation or emergency crew) is on foot the speed will be negligible. However, when the crew is traveling in a vehicle, the speed of the vehicle will be indicated. As shown, the scrolling display 716 places GPS co-ordinates 718 in the context of a geographical map 736 with road infrastructure 738. In some embodiment the geographical map 736 may be in the form of an aerial photo.

FIG. 9 is an exemplary scrolling display including a pop-up display screen, according to some embodiments of the present invention. As depicted, scrolling display 716 has a pop-up display screen 740 which provides vital data identifying characteristics of the closest selected utilities 720. In the illustrated example, the utility identified is a natural gas pipeline owned by Process Energy-Eastern North Carolina Natural Gas™, serviced out of a contact office in Raleigh, N.C.

One advantageous aspect is the dynamic nature of scrolling display 716, which scrolls as the GPS co-ordinates of GPS co-ordinate device 714 change. This scrolling aspect is particularly apparent when the crew is approaching a site in a vehicle. The system continuously scans the GPS data it receives: first, to ascertain the position of GPS co-ordinate device 714 and second, for relative co-ordinates of utility hazards. All of the displays continually scroll and update the data with movement of GPS co-ordinate device 714. When one gets within a pre-determined area of interest, a circular icon 746 appears on scrolling display 716 and locks onto the closest utility to show the point at which GPS co-ordinate device 714 will cross the utility if it continues in the same direction (FIG. 8).

Referring back to FIG. 8, scrolling display 716 may also be manually scrolled using an on screen up arrow 742 or an on screen down arrow 744, to enable the crew to manually look ahead, without changing their position.

In one embodiment, the utility location and damage prevention system of the present invention is used for automating the guidance of excavation (digging) machines. The automated navigation system of the present invention utilizes a GPS and the location of obstacles such as buried utility lines in an underground (sub-surface) environment to provide automatic and/or semi-manual guidance to the digging machine and/or a machine operator.

In one embodiment, the navigation system of the present invention is designed to provide excavation and ground-penetration/ground-breaking machine operators with a synthetic display of the underground environment, and provide steering information to a machine guidance module. The method and system can be driven by a design dig alignment and awareness of any known obstructions/obstacles such as buried utilities (and their location) that lie in the path of the operation. A GPS driven damage prevention system is described in a co-pending PCT Application with International Publication Number WO 2006/014724 A3, and entitled "Precision GPS Driven Utility Asset Management And Utility Damage Prevention System And Method," the entire contents of which is hereby expressly incorporated by reference.

Figure 10:
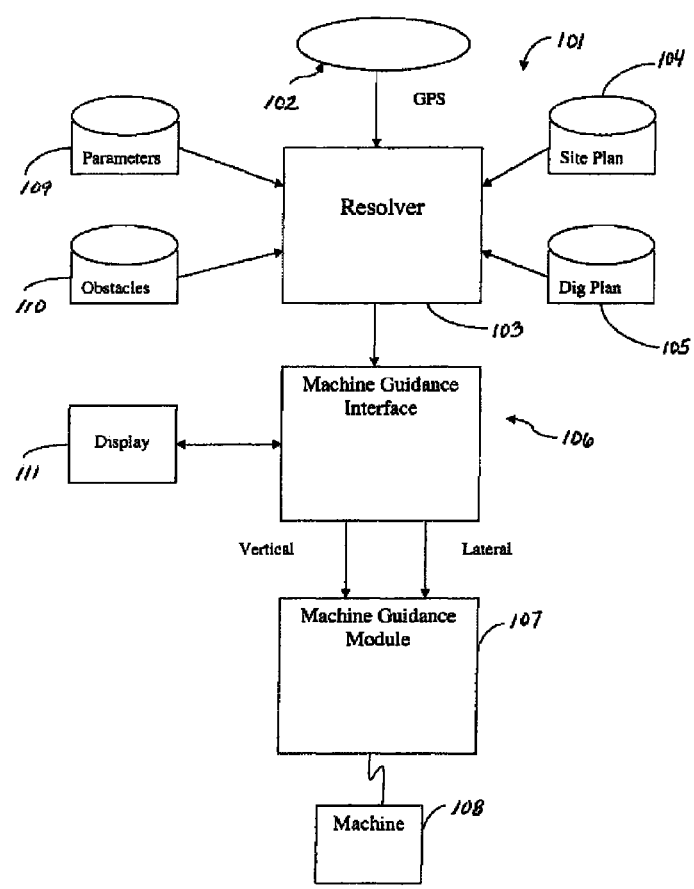
FIG. 10 is an exemplary block diagram of an exemplary digging navigation system, according to some embodiments of the present invention.

FIG. 10 is an exemplary block diagram of a digging navigation system 100, according to one embodiment of the present invention. A site plan 104 includes a map composed of a land parcel defined by latitude and longitude coordinates of each boundary point. The shape of the parcel may be any square, rectangle or polygon. Site data records in the site plan 104 may also contain topographic maps, aerial photography, land survey data, political subdivision boundaries, flood plain data, geological data, and the like.

In addition, the site data record can contain the locations of all installed improvements within the parcel boundaries. The locations of these improvements can be above the surface of the ground, or below the ground surface. These locations can be described by a system of coordinates depicting the improvement's lateral position, and when available, the improvement's vertical position as depth below surface or to a standard reference elevation, for instance Mean Sea Level (MSL).

Additionally, the site data record can contain engineering designs of improvements to be constructed within the parcel boundaries, including improvements to be constructed under the surface of the ground. These underground improvements are depicted by a lateral alignment (center-line) and a vertical alignment (elevation). For purposes of construction, the alignment of these improvements may be further illustrated with sizes (diameters, length, width, height) of the installed utilities, trench dimensions to be excavated, and materials to be installed with the construction. The site data record is typically digitized for purposes of storage, retrieval, display, manipulation, attribution, information addition/deletion and archiving.

A Precision GPS system 102 provides location data to a Resolver module 103. In one embodiment the GPS system 102 is capable of resolving locations within centimeters in the horizontal datum and within centimeters in the vertical datum (1 Sigma) of the International Terrestrial Reference Frame.

A Dig plan 105 includes a digital representation of the Lateral Alignment and Vertical Alignment of the location, depicted by a series of "Waypoints" which include latitude, longitude and elevation. When used in reference to an engineering plan or drawing, Lateral Alignment refers to a line, arc, composite curvature or series of line segments, with each line or line segment defined by a longitude and latitude coordinate set at each end or waypoint. A lateral position is a location upon a horizontal plain or site data record, identified by a latitude and longitude coordinate pair. A vertical position is a location in the vertical datum, referenced either to a known surface or elevation, usually described as feet, meters above or below the reference surface, for instance, "4,820 feet MSL" refers to an elevation above "Mean Sea Level," a standard reference.

The waypoints are typically connected by straight lines, or by computer-generated arcs or compositions of lines and arcs and by elevations. In other words, each waypoint needs to be described by three coordinates.

The digging navigation system 100 also includes a Resolver module 103. The Resolver module 103 provides a means of "coupling" a machine guidance system 107 to the GPS system 102. A "tool position in space" of a tool mounted on any boom or extension is calculated through the application of a series of known offsets from the GPS system 102. The digging machine includes a Machine Longitudinal Axis (usually a line drawn through the geometric or gravitational center of an excavation machine and parallel to the machine's longest dimension; a Machine Lateral Axis (a line drawn perpendicular to a machine's longitudinal axis, and through the same center point selected for the Machine Longitudinal Axis; a Machine Vertical Axis (a line drawn through an excavation machine (for instance a backhoe) that describes the unit's principal axis of rotation about its base, or its geometric or gravitational center; and a Machine Logical Center (the point of intersection of the Machine Longitudinal Axis, the Machine Lateral Axis and the Machine Vertical Axis). The Machine Logical Center represents a "zero-basis" for purposes of offset calculations.

The offset is typically a calculation (in three dimensions) of a point's Position In Space from a reference point's Position In Space. The calculation inputs include the azimuth angle, the vertical component and the horizontal component. Given a longitude, latitude and elevation for the reference point, the Position In Space of the new point can be precisely calculated by applying the "offset" to the reference point. A "Position In Space" is typically a location described by three coordinates including a latitude, longitude and elevation. This term may be appended to a machine or device name as in, "Machine Position in Space," whereby an arbitrary "center" is established and the calculation of "offset" from the "GPS Receiver Position in Space," is applied.

Referring back to FIG. 10, in one embodiment, the Resolver module 103 utilizes the present course or track of the digging tool and compares it with the desired course or track. Resolver module 103 consults a data base 110 for the presence of utilities or other obstructions located within the work path. The Resolver module 103 then utilizes a Machine Guidance Interface 106 to issues left-right and vertical steering commands to a machine guidance system 107 to correct the course of a digging machine (ground breaking equipment) 108.

These control inputs may also be depicted to a machine operator on a multi-purpose visual display device called a Dig Director 111. This display shows the machine operator what she/he should do to guide the Digging Tool to the desired location and altitude, relative to present position, course and altitude of the Digging Tool.

In one embodiment, the Dig Director 111 is a visual display including a digital monitor and computer-generated images of the Site Data Record, the Dig Plan, and the Digging Tool position all rendered on the monitor in real-time. In addition, any deviation of the Digging Tool alignment from the Dig Plan is indicated, and directional bars showing the machine operator what control inputs are required to correct the path of the Digging Tool.

Referring back to FIG. 10, the digging navigation system 100 also includes a Machine Guidance Interface 106. In one embodiment, the Machine Guidance Interface 106 includes specification that describes the types of available input and output. It also includes physical connections for transferring left/right and up/down steering commands from the digging navigation system to a Machine Guidance module 107 that interfaces with various control systems on the digging machine 108.

In one embodiment, the Machine Guidance module 107 includes an input system to receive steering commands (left/right, up/down) and an interface to the machine's control system (for instance, mechanical cables, hydraulic servo-mechanical valves, or digital control system). The module receives steering commands (left/right and up/down) provided by the Machine Guidance Interface 107 and based upon the machine parameters 109, provides inputs to the controls, positioning the machine 108 and/or the Digging Tool as required.

In one embodiment, the system of the present invention receives location inputs from a GPS, compares those inputs to a site data record retained in a data base, then through various software programmed processes, provides answers to the following questions:
1. Where am I? (Current location and position)
2. Where do I want to go? (Dig Plan)
3. Where should I be? (Desired location and position)
4. What obstacles are in my way?

In one embodiment, an excavator guidance system processes inputs from the GPS to establish its known position, compares the position to a construction design to determine the lateral alignment and vertical elevation of the desired excavation, and consults a data base for the presence of utilities or other obstructions located within the work path.

The "Where Am I" question is answered through the use of a GPS in conjunction with certain augmentation systems. Augmentation systems improve the accuracy of a GPS receiver's position through application of various signal enhancing technologies.

The "Where do I want to go" question is related to the "Dig Plan" synthesized from the construction drawing Lateral and Vertical alignments. The Dig Plan may be over-laid on the Site Data Record and presented visually to the machine operator. The operator can guide the machine manually by reference to this presentation and its Dig Director, or turn guidance over to a Machine Guidance module for automated operation.

The "Where should I be" question is answered by comparing the current position to the desired position depicted on a construction specification. Any deviation between the two is determined by the system's Resolver module, measured and displayed on a monitor. Preferably, the excavation Machine Longitudinal Axis is aligned with (overlay) the Lateral Alignment of the construction feature design. In addition, the vertical elevation of the trench floor, centerline of a bore or other reference is displayed and differences (deviations) from the Dig Plan alignment are determined.

Examples of Vertical Alignment include:
1) A trench floor that is "level"
2) A trench floor that slopes at a constant gradient between two or more points
3) A trench floor that is a specific distance (depth) below the topographical surface directly upon which the machine is operating.
4) Any of these may be applied to precision boring or ramming operations as a centerline alignment.

In one embodiment, the deviations from the Dig Plan are displayed visually to the operator on a Dig Situation View. The Dig Situation View is a digital visual presentation of the current navigation situation and includes a pictorial display of as many "layers" of information (e.g., topography, design alignment, know obstacles, etc.) the operator may require. With guidance indicators or "bars" called a "Dig Director," the display shows the operator which direction he must move the machine and or the Digging Tool to return to and maintain alignment with the Dig Plan. This information is rendered in real-time display.

When coupled through a Machine Guidance Interface to a Machine Guidance module, left/right and up/down steering commands are automatically provided to the Machine Guidance module for real-time corrections of dig alignment in the lateral and vertical dimensions.

The answer to the question of "What obstacles are in my way?" is provided by a Synthetic Vision Underground (SVU) view. In one embodiment, the SVU is a computer-generated 3-dimensional view of the underground environment. The view is aligned along the Dig Plan, and through the use of scaling features may include an area larger than the Dig Plan section at the present location. The view may include surface features as well. Through a series of sequentially smaller shapes, (for instance, squares, rectangles or polygons) aligned with the axis of the Dig Plan, and imposed or layered upon the view, a 3-dimensional effect is achieved in a two-dimensional display.

Because previously buried/installed utilities, artifacts, protected areas or "no-dig" zones are often invisible to the machine operator from his/her position in/on the machine, the locations of previously located features are displayed for the operator via a monitor. In addition, attributes (if previously cataloged) of each feature are presented for the operator's information. Using the monitor an operator can "see" obstacles and obstructions as they are approached and guide the excavation process, avoiding damage to those features. The SVU includes a Dig Director which shows the operator what control inputs are necessary to guide the Digging Tool around the obstacle. Depending on the resolution of the machine's control system, these inputs could be very fine, with high-resolution (perhaps within a fraction of an inch.)

When coupled through the Machine Guidance Interface to the Machine Guidance module, left/right and up/down steering commands are supplied to the machine control system to automatically continue progress of the ground-breaking/penetrating operations while avoiding the buried/installed utilities and/or no-dig zones. In the case of approaching protected zones, the machine control can stop the excavation.

A display similar to the scrolling display 716 may be used for displaying GPS coordinates of the ground breaking equipment (digging tool) on a display 722 together with a series of GPS coordinates 718 for one or more of selected utilities 720, such that the relative position of the digging machine to one or more selected utilities 718 is always known.

In one embodiment, the scrolling display 716 dynamically scrolls the screen as the GPS coordinates of the digging machine change. The system continuously scans the GPS data it receives: first, to ascertain the position of the digging machine and second, for relative coordinates of utility hazards. Similarly, when the digging machine gets within a predetermined area of interest, a circular icon 746 appears on scrolling display 716 and locks onto the closest utility to show the point at which the digging machine will cross the utility if it continues in the same direction.

In one embodiment, the system and method of the present invention is used in precision excavation. Because earth is expensive to move and to replace, precision control of excavation alignment and elevation can produce cost savings. Precision control of the trench or bore means only the earth that must be moved to meet the Dig Plan will be removed. Conversely, with precision Lateral and Vertical Alignment of the excavation, accidental over digs are reduced, meaning fill corrections and replacement backfills are minimized.

Moreover, since the trench floor grades are precisely controlled, the invention reduces the need for padding and additional alignment efforts (for instance, laser-guided alignment of pipe as it is installed in the trench). Pipe is placed on the undisturbed earth of the trench floor reducing the possibility of settlement beyond specification when backfill is placed over the installed line. This reduces re-work.

In certain situations, the Dig Plan may specify a trench width that exceeds the Digging Tool width. With digital control, the precise trench width can be achieved with considerable improvements in accuracy and efficiency. Where "benching" is required either to reduce cave-in hazard, or to provide additional floor depth below surface and beyond the machine's dig depth, the bench dimensions can be included in the Dig Plan and digital guidance provided the operator or to the Machine Guidance System, to construct the bench, thus improving safety and reducing wasted effort.

In one embodiment, the system and method of the present invention is used in damage prevention of the digging machines and/or the utility equipment and cables buried under ground. The system can depict previously located but invisible utilities and other obstructions or "No-Dig" areas. By comparing the Digging Tool Position In Space to the Utility/Obstruction/No-Dig Position In Space, and comparing that to a potential tool position, the system provides visual displays to the operator and steering commands to the machine so as to prevent the tool from contacting (and potentially damaging) the invisible objects.

Furthermore, a SVU provides the machine operator with a view of the invisible paths and objects. As the operator advances the excavation, she has improved awareness of the position of her Digging Tool in relation to invisible buried features along the path of travel and excavation. For precision control, offsets are generated to show the precise position of the Digging Tool. This visualization can be layered upon the Site Data Record showing the operator precisely where the Digging Tool is located and what its potential "sphere" is at any time. Visual and audible alarms can alert the operator of potential conflict.

Through a Dig Situation Information System, Digging Tool steering commands (left/right, up/down) can be provided in digital or analog format to a Machine Guidance module. This provides complete guidance of the machine's position relative to the Dig Plan, and of the Digging Tool's Position In Space. Offsets for calculating the Digging Tool's Position In Space are provided automatically by the Machine Guidance module. From a known GPS Receiver Position In Space, or from the Machine Logical Center Position, the "Sphere of Influence" is computed from known parameters such as:
  A. Boom Vertical Axis APIS
  B. Boom Lateral Axis APIS
  C. Boom dimensions
  D. Boom swing limits
  E. Digging Tool position relative to Boom end.
  F. Digging Tool's aspect to a reference
  G. Machine control system resolution capabilities.
This Sphere of Influence is projected onto the Dig Situation View and can be incorporated into the SVU display, shown in real-time.

It should be appreciated based on the teachings herein that a utility location system may take a variety of forms. For example, the GPS antenna and other components may be used in conjunction with types equipment other than those types specifically mentioned here. In addition, the specific components used in and operations performed by a given system may depend on the unique requirements of the system.

It also should be appreciated that the various components and features described herein may be incorporated in a system independently of the other components and features. For example, a system incorporating the teachings herein may include various combinations of these components and features. Thus, not all of the components and features described herein may be employed in every such system.

Different embodiments of the invention may include a variety of hardware and software processing components. In some embodiments of the invention, hardware components such as controllers, state machines and/or logic are used in a system constructed in accordance with the invention. In some embodiments code such as software or firmware executing on one or more processing devices may be used to implement one or more of the described operations.

The components and functions described herein may be connected and/or coupled in many different ways. The manner in which this is done may depend, in part, on whether and how the components are separated from the other components.

The signals discussed herein may take several forms. For example, in some embodiments a signal may be an electrical signal transmitted over a wire, other signals may consist of light pulses transmitted over an optical fiber or through another medium, some signals may comprise RF signal the travel through the air. A signal may comprise more than one signal. For example, a signal may consist of a series of signals. In addition, a group of signals may be collectively referred to herein as a signal. Signals as discussed herein also may take the form of data. For example, in some embodiments an application program may send a signal to another application program. Such a signal may be stored in a data memory.

A wide variety of devices may be used to implement the database and data memories discussed herein. For example, a database or data memory may comprise RAM, ROM, disks, flash memory or other types of data storage devices.

In summary, while certain exemplary embodiments have been described above in detail and shown in the accompanying drawings, it is to be understood that such embodiments are merely illustrative of and not restrictive of the broad invention. In particular, it should be recognized that the teachings of the invention apply to a wide variety of systems and processes. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as described herein.

What is claimed is:

1. A computer implemented method for collecting information related to utility assets comprising:
   determining a position of an underground utility asset by a location determining device;
   in real time and by one or more processors, integrating location data from a Global positioning system (GPS) receiver with the determined position of the underground utility asset to provide information about depth, longitudinal and latitudinal coordinates of the position of the underground utility asset;
   adding, by one or more processors, characteristics of the underground utility asset including a size of the underground utility asset, to the integrated data to generate one or more data records for the underground utility asset including the information about depth, longitudinal and latitudinal coordinates of the position of the underground utility asset;
   in real time, integrating landbase data with the one or more data records for the underground utility asset to generate a precision integration data record;
   including a first buffer zone around the position of the underground utility asset, in the precision integration data record;
   generating an error correction signal for correcting the position of the underground utility asset determined by the location determining device;
   generating a second buffer zone around the position of the underground utility asset, based on the error correction signal; and
   in real time, displaying a scrolling map including the one or more data records, the first buffer zone, the second buffer zone, and a portion of the landbase data on a display device.

2. The method of claim 1 further comprising defining a project area including the position of the underground utility asset, wherein the scrolling map is a map of the project area.

3. The method of claim 1 further comprising attaching symbols input by a user to the landbase data and the one or more data records.

4. The method of claim 1 further comprising storing the one or more data records in a remote database.

5. The method of claim 4 further comprising retrieving a warning zone for a nearest utility asset from the stored information; and generating a warning signal in accordance with a distance to the nearest utility asset.

6. The method of claim 1 wherein the location determining device comprises one of the group consisting of a Radio Frequency Identification Device (RFID) reader, a ground penetrating radar, an electromagnetic imaging device, and a computer aided tomography device.

7. The method of claim 2 further comprising integrating an imagery of the project area with the data records to generate an image representation of the project area.

8. The method of claim 1 further comprising integrating the one or more data records with a Geographical Information System (GIS) landbase template including a map imagery and infrastructures to create a precision grid including the location of the utility asset, the map imagery and the infrastructures.

9. A system for collecting information related to utility assets comprising:

a location determining device for determining a position of an underground utility asset;

a processor for integrating, in real time, location data from a Global positioning system (GPS) receiver with the determined position of the underground utility asset to provide information about depth, longitudinal and latitudinal coordinates of the position of the underground utility asset, adding characteristics of the underground utility asset including a size of the underground utility asset, to the integrated data to generate one or more data records for the underground utility asset including the information about depth, longitudinal and latitudinal coordinates of the position of the underground utility asset; integrating landbase data with the one or more data records for the underground utility asset to generate a precision integration data record, and including a first buffer zone around the position of the underground utility asset, in the precision integration data record;

a position error detector for generating an error correction signal for correcting the position of the underground utility asset determined by the location determining device, wherein the processor generates a second buffer zone around the position of the underground utility asset, based on the error correction signal; and a display device for displaying a scrolling map including the one or more data records, the first buffer zone, the second buffer zone, and a portion of the landbase data.

10. The system of claim 9 further comprising an input device for defining a project area including the position of the underground utility asset, wherein the scrolling map is a map of the project area.

11. The system of claim 9 wherein the processor attaches symbols input by a user to the landbase data and the one or more data records.

12. The system of claim 9 further comprising a remote database server for storing the one or more data records.

13. The system of claim 12 wherein the processor retrieves a warning zone for a nearest utility asset from the stored information; and generates a warning signal in accordance with a distance to the nearest utility asset.

14. The system of claim 9 wherein the location determining device comprises one of the group consisting of a Radio Frequency Identification Device (RFID) reader, a ground penetrating radar, an electromagnetic imaging device, and a computer aided tomography device.

15. The system of claim 10 wherein the processor integrates an imagery of the project area with the data records to generate an image representation of the project area.

16. The system of claim 9 wherein the processor integrates the one or more data records with a Geographical Information System (GIS) landbase template including a map imagery and infrastructures to create a precision grid including the location of the utility asset, the map imagery and the infrastructures.

* * * * *